United States Patent [19]

Niziol

[11] 4,421,366
[45] Dec. 20, 1983

[54] SELF-ASSEMBLY FURNITURE

[76] Inventor: Chester Niziol, 91 Yonge St., Suite 401, Toronto, Ontario, Canada, M5C 1S8

[21] Appl. No.: 173,115

[22] Filed: Jul. 28, 1980

[51] Int. Cl.³ .................... A47B 43/00; A47B 48/00
[52] U.S. Cl. ............................ 312/257 A; 403/408; 403/188; 16/389; 211/182
[58] Field of Search .......................... 403/169–178, 403/405, 408, 402, 388, 187, 188, 189, 410; 217/69; 211/182; 312/257 R, 257 A; 16/389

[56] References Cited

U.S. PATENT DOCUMENTS

| | | | |
|---|---|---|---|
| 1,283,079 | 10/1918 | Cochrane | 217/69 X |
| 3,439,377 | 4/1969 | Bucholz | 16/389 |
| 3,466,071 | 9/1969 | Reed | 403/230 X |
| 3,506,326 | 4/1970 | Tantillo | 16/389 |
| 4,014,618 | 3/1977 | Kristiansen | 403/231 X |
| 4,278,361 | 1/1981 | Steinke | 403/189 |
| 4,301,636 | 11/1981 | Luria | 403/405 X |

Primary Examiner—Wayne L. Shedd
Attorney, Agent, or Firm—John J. Swartz

[57] ABSTRACT

Apparatus for forming any selected one of a plurality of different articles of furniture, such as seating, storage, and sleeping units comprising a plurality of panels each having inner and outer faces terminating in a perimetrical edge, and mechanism for detachably coupling any selected number of the panels together in angular relation such that the perimetrical edge of each panel is positioned inwardly of the outer face of an adjacent angularly related panel and the outer face of each panel is positioned outwardly of the perimetrical edge of the adjacent angularly related panel to provide outwardly opening openings adjacent the adjacent perimetrical edges of adjacent panels. One aspect of the invention includes a coupling for coupling adjacent angularly related panels to form outwardly opening openings at the adjacent ends of adjacent panels.

16 Claims, 11 Drawing Figures

SELF-ASSEMBLY FURNITURE

BACKGROUND OF THE INVENTION

This invention relates to a modular unit of furniture including a plurality of panels coupled together in such manner to provide outwardly opening openings at the adjacent ends of the adjacent panels. The modular unit may be selectively coupled to similarly constructed modular units in selected combinations to provide any one of a plurality of different items of furniture. Conventionally constructed furniture includes side, end, and back wall members having planar ends mounted such that the planar end of one panel is flush with the outer face of an abutting panel. The style of furniture available to potential purchasers is conventional. Accordingly, it is an object of the present invention to provide apparatus for forming a unit of furniture having adjacent panels coupled together in such a manner as to form outwardly opening openings between the adjacent ends thereof.

Much of the furniture presently being manufactured is assembled or pre-assembled at the manufacturing site and subsequently shipped to wholesalers and retailers throughout the country. Pre-assembled furniture is relatively bulky and thus shipping costs are relatively high. Society is becoming increasingly mobile and shipping costs for individuals moving such assembled or partially assembled furniture is likewisely becoming increasingly expensive. A large portion of such assembled and preassembled furniture is limited to form one particular item of furniture and is not generally convertible, without substantial alteration, to form a different unit of furniture. Accordingly, it is an object of the present invention to provide apparatus for forming a modular, knock-down furniture unit, convertible for use in constructing any one of a plurality of different furniture items.

Another object of the present invention is to provide apparatus for forming a modular furniture component which can be combined in various combinations with similarly constructed modular units to form various items of furniture suitable for seating, sleeping, and storage.

Still another object of the present invention is to provide apparatus for forming a modular furniture unit for use in combination with a multiple of similarly constructed modular units to form any one of a plurality of various furniture combinations.

A further object of the present invention is to provide apparatus for forming a knock-down modular furniture unit which can be easily assembled and disassembled.

A still further object of the present invention is to provide an article of furniture which can be assembled and disassembled, including a plurality of panels and mechanism for detachably coupling the panels such that the end face portions of each panel are positioned inwardly of the adjacent outer side faces of adjacent, angularly related panels and the outer face of each panel is positioned outwardly of the adjacent end face of an adjacent angularly related panel to provide outwardly opening openings between adjacent portions of the end faces of adjacent panels.

Another object of the present invention is to provide apparatus for forming an article of furniture comprising a plurality of panels and mechanism for coupling angularly related panels such that portions of the end faces of each panel are disposed adjacent a portion of an end face of an adjacent panel to provide outwardly opening channels between the adjacent ends of adjacent panels.

Yet another object of the present invention is to provide new and novel coupling apparatus for detachably coupling angularly related panel members so as to provide outwardly opening openings at the adjacent ends of adjacent panels.

These and other objects of the present invention will become more readily apparent as the description thereof proceeds.

SUMMARY OF THE INVENTION

Apparatus for forming any selected one of a plurality of different articles of furniture comprising a plurality of panels each including inner and outer side faces and a plurality of end face portions joined to the inner and outer side faces at inner and outer perimetrical edge portions; and mechanism for coupling the panels in angular relation to adjacent ones of the panels with an inner edge portion of one of the end face portions of each panel being adjacent one of the adjacent inner edge portions of an adjacent end portion of an adjacent panel and the opposing outer edge portion of each adjacent end face portion of adjacent panels being spaced apart a predetermined distance to form outwardly opening, openings between the adjacent end face portions of adjacent panels.

BRIEF DESCRIPTION OF THE DRAWINGS

The present invention may more readily be understood by reference to the accompanying drawings, in which.

DESCRIPTION OF THE INVENTION

Figure 1:
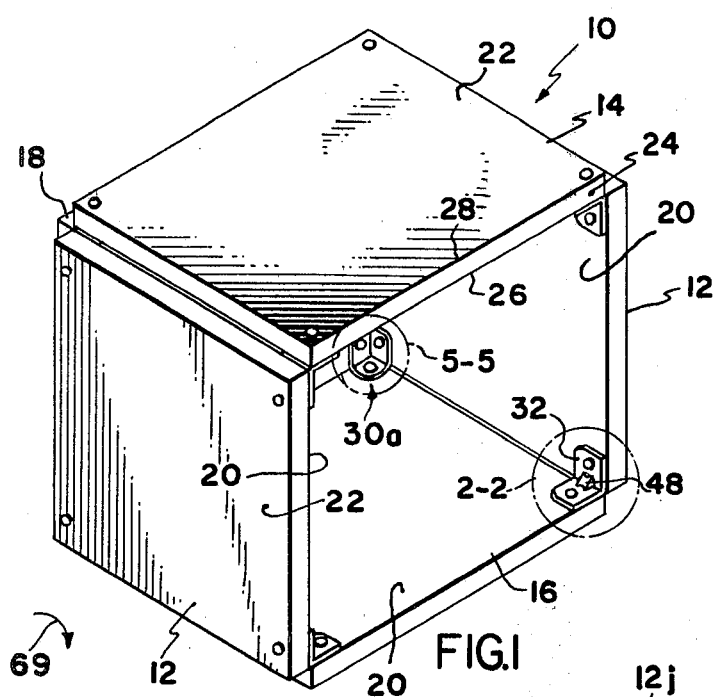
FIG. 1 is a perspective view of a modular furniture unit constructed according to the present invention.

A modular furniture component constructed according to the present invention is generally designated 10 and includes generally planar, upstanding, sidewall members 12, generally planar top and bottom walls 14 and 16 respectively, and a generally planar rear wall panel 18. The panels 12, 14, 16, and 18 are substantially identical and each includes a generally planar inner face 20 and outer face 22 spanned by four perimetrically extending end faces 24. Panels may suitably comprise a particleboard core which may or may not be covered with layers of veneer melamine or the like. The end faces 24 are joined to the inner and outer faces 20 and 22 via inner and outer, perimetrically extending edges 26 and 28 respectively.

Figure 4:
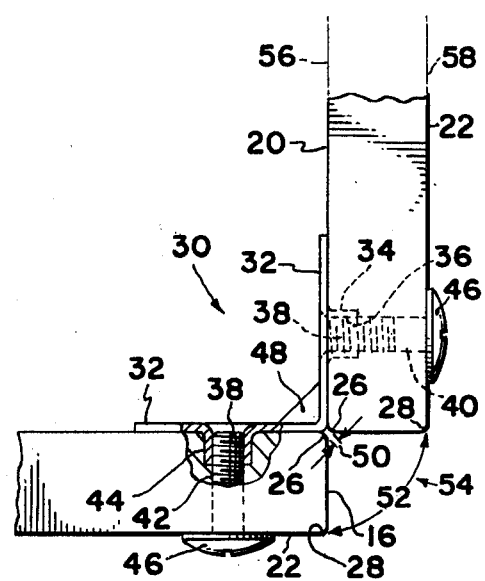
FIG. 4 is an enlarged, front elevational view of the portion illustrated in FIG. 2.

Coupling apparatus, generally designated 30, is provided for mounting the side panels 12 to the top and bottom panels 14 and 16, and includes a pair of right angularly related, integral flange members 32. Each of the flange members 32 includes an annular, outwardly projecting, extruded projection 34 including internal threads 36 for receiving the threaded end 38 of a bolt 40 which passes through an aligned aperture 42 provided in the panels 12, 14, and 16. The bore 42 may be countersunk as illustrated at 44 for snugly receiving the extruded projection 34. The bolts 40 include bolt heads 46 for bearing against the outer face 22 of the various panels. An integrally formed gusset 48 spans the right angularly related flanges 32 to reinforce the coupling member 30. It should be noted that the coupling member 30 mounts the side panels 12 to the top and bottom panels 14 and 16 such that the inner perimetrical edges 26 of adjacent panels are spaced apart by a distance, represented by the reference character 50, (FIG. 4) and the outer perimetrical edges of adjacent panels are spaced apart a greater predetermined distance, represented by the reference character 52, to provide outwardly opening, open ended openings or channels, generally designated 54 which results in a new and novel furniture style and construction.

The end face 24 of each panel 12, 14, 16, and 18, lies in the plane 56 (FIG. 4) of the inner planar face 20 of the right angularly related, adjacent panel, and likewisely inwardly of the plane 58 of the outer face 22 of each adjacent panel.

Figure 5:
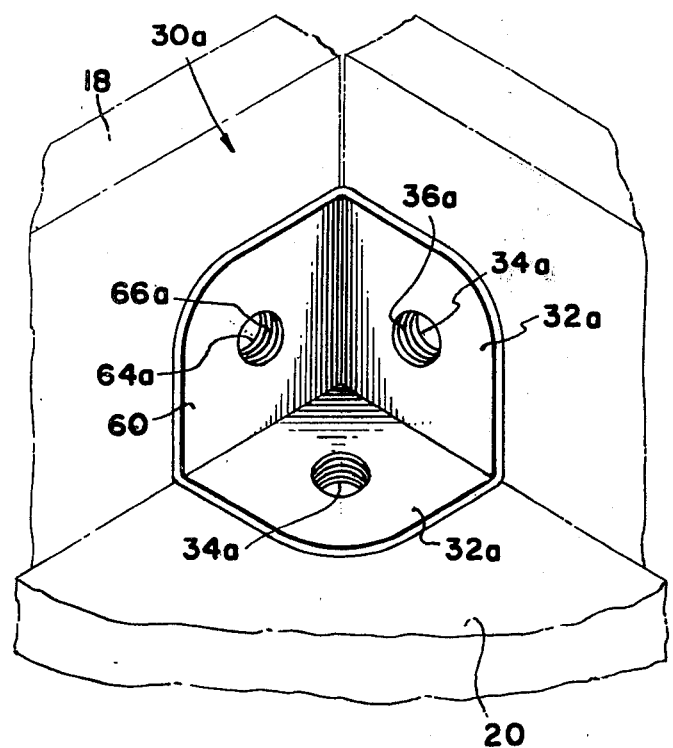
FIG. 5 is an enlarged, perspective view illustrating the portion of the apparatus encircled in the chain lines 5—5 of FIG. 1.
Figure 2:
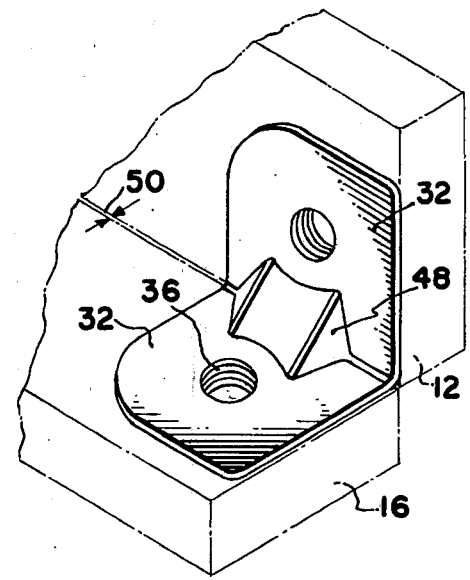
FIG. 2 is an enlarged, perspective view of the portion iliustrated in the chain line circle in FIG. 1.

The rear wall 18 is coupled to the sidewalls 12 and top and bottom panels 14 and 16 via a slightly modified connector or coupling member, generally designated 30a (FIG. 5). The connector 30a is generally similar to the connector 30 and generally similar parts will be referred to by generally similar reference characters followed by the subscript a. The connector 30a includes a third flange member 60 which is integral with the flanges 32a but disposed at right angles thereto. The flange 60 includes an annular, outwardly projecting portion 64a which is internally threaded as illustrated at 66a. The rear wall panel 18 includes a bore 42 and counterbore 44 identical to that previously described with relation to FIG. 3 for receiving the internally threaded projecting portion 64a. A bolt 40 passes through the bore 42 and is received by the threaded projection 64a to similarly couple the rear panel 18 to the flange 60.

The article of furniture 10, in the position illustrated in FIG. 1, may suitably serve as an end table as well as a storage unit. If the item of furniture is rotated 90° in the direction of the arrow 69 (FIG. 1), the rear wall 18 will then become the top wall, suitable for use as a seat.

Figure 6:
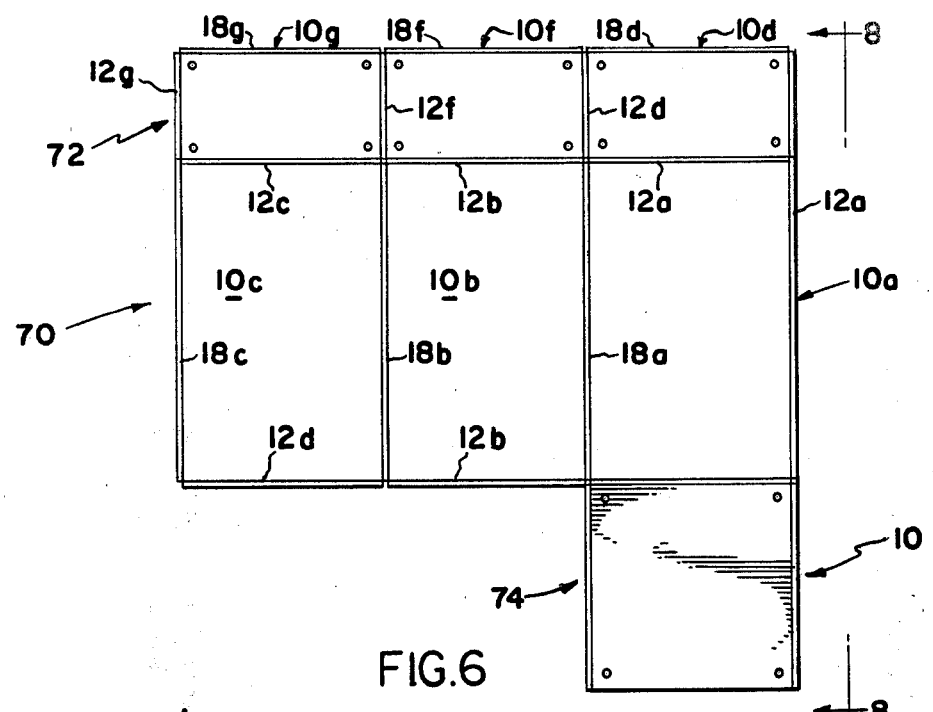
FIG. 6 is a top plan sectional view, taken along the line 6—6 of FIG. 7, illustrating a combination article of furniture constructed with various combinations of the individual modular unit illustrated in FIG. 1.
Figure 7:
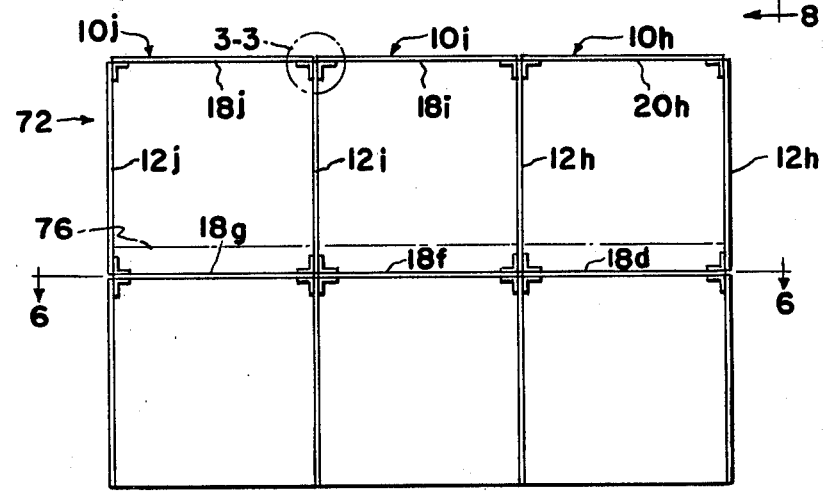
FIG. 7 is a side elevational view of the apparatus illustrate in FIG. 6.
Figure 8:
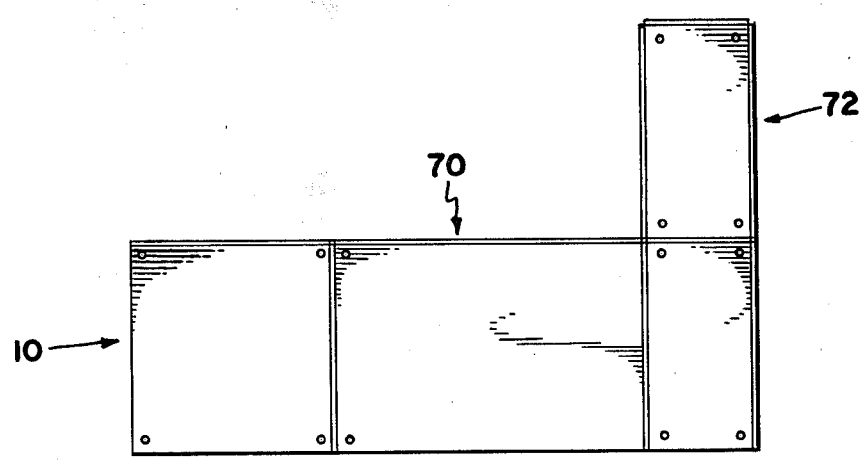
FIG. 8 is an end elevational view, taken along the line 8—8 of FIG. 6.

Referring now more particularly to FIGS. 6, 7, and 8, the basic modular unit 10 is illustrated in combination with similarly constructed modular units designated 10a, 10b, 10c, 10d, 10f, 10g, 10h, 10i, and 10j, to form a combination article of furniture including a bed frame 70, bookshelves 72, and an end table or study desk 74. The modular units 10a–10j include components similar to that illustrated for the unit 10 and generally similar parts will be identified with generally similar numerals followed by the subscript a–j respectively. It should be understood that although the lengths and widths of the various panel members of the modular units 10a–10g may vary, the basic construction of each modular unit illustrated remains the same. It should be further noted that the units 10f and 10g only include one sidewall 12f and 12g as these units incorporate the side walls 12d and 12f of adjacent modular units 10d and 10f respectively to complete the individual box-like units. A mattress, illustrated in chain lines and generally designated 76, may be mounted within the units 10a, 10b, and 10c to complete the bed unit 70.

Figure 3:
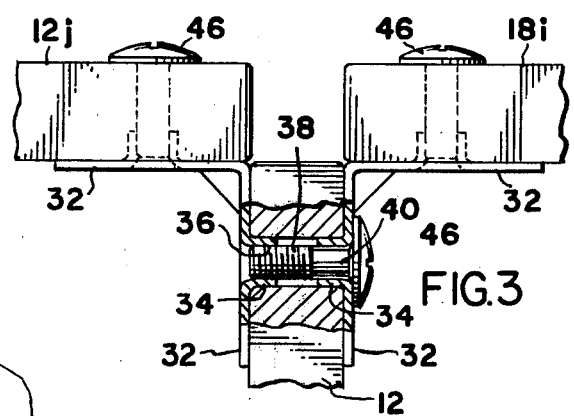
FIG. 3 is an enlarged, side elevational view of the portion illustrated in the chain line circle 3—3 of FIG. 7.

The cabinets or bookshelves 72 are completed by mounting similar modular units 10h, 10i, and 10j above the modular units 10d, 10f, and 10g, as illustrated in FIG. 7. It should be noted that the units 10i and 10j only include one side wall 12i and 12j as each of the units, 10i and 10j, utilize the adjacent walls 12h and 12i of the adjacent modular units 10h and 10i respectively, to complete their box-like configuration. As illustrated in FIG. 3, the adjacent units 10i–10j are coupled together via the bolts 40 which are each freely received in an unthreaded projection 34 of the flange 32 abutting one face of the panel 12i and then threaded into the opposing threaded projection 34 on the flange 32 bearing against the opposite face of the panel 12i.

Figure 9:
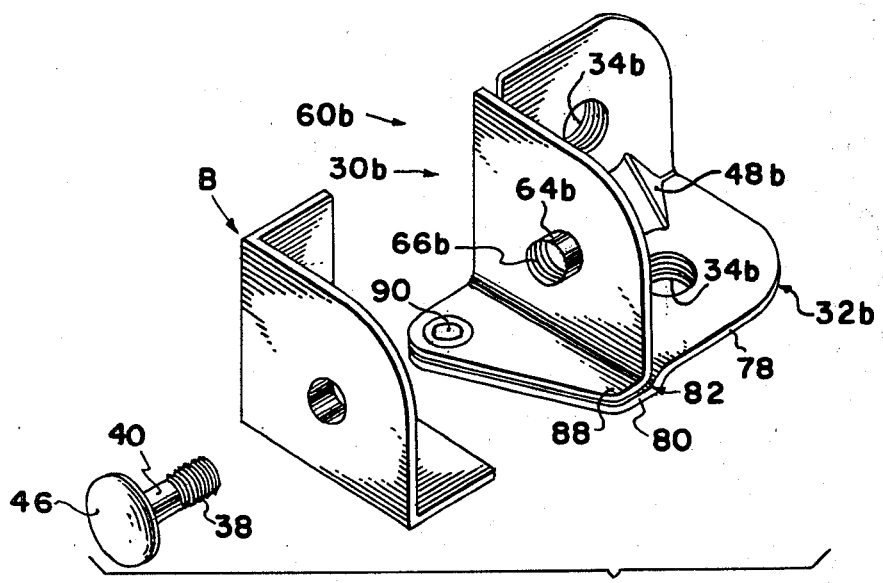
FIG. 9 is a perspective view of a combination two-way connector-pivot hinge and corner bracket constructed according to the present invention.
Figure 10:
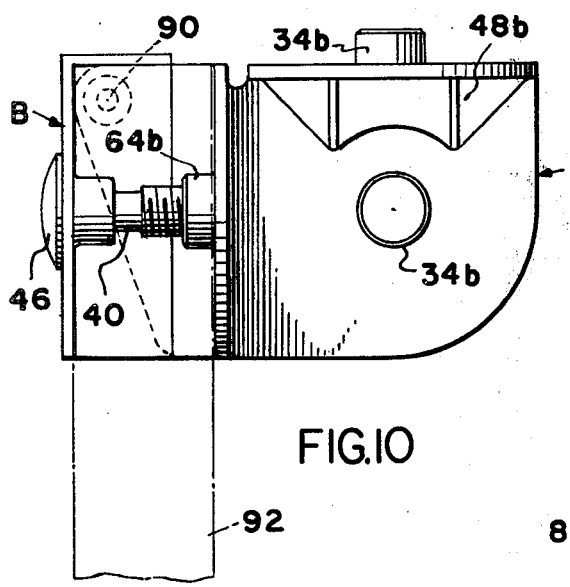
FIG. 10 is a top plan view thereof.
Figure 11:
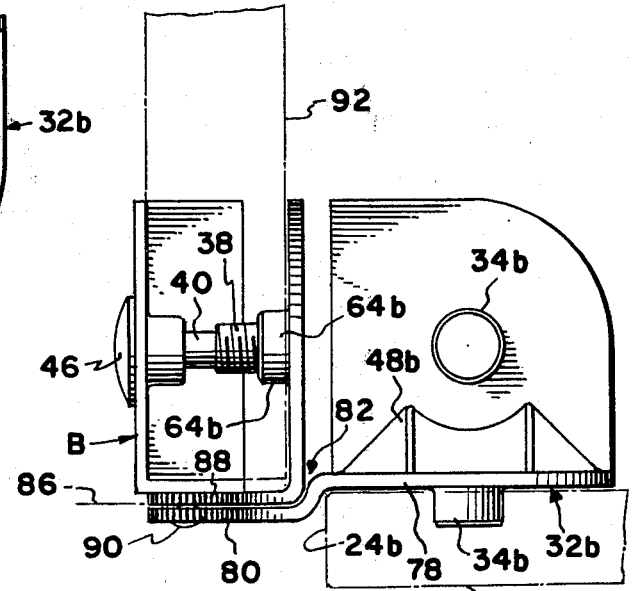
FIG. 11 is a front elevational view thereof.

The hinge-connector, illustrated in FIGS. 9-11, is generally designated 30b, and includes a pair of right angularly related flanges, generally designated 32b. A gusset 48b spans the flanges 32b. The flanges 32b include annular, internally threaded outwardly projecting members 34b constructed substantially identical to the extruded thread projections, described heretofore.

One of the flange members 32b includes a first, generally planar flange portion 78 and an offset, generally planar second flange section 80, coupled to the first flange section 78 by a bridging section 82. As illustrated in FIG. 11, the plane 84 of the second flange section 80 is parallel to the plane 86 of the flange portion 78.

The connector 30b also includes a third flange section, generally designated 60b, including a annular, outwardly extending, extruded projection 64b internally threaded as illustrated at 66b. The flange 60b is illustrated as being disposed at right angles in FIG. 9 to the flange members 32b. The flange member 60b includes an offset flange portion 88 disposed at right angles relative to the flange member 60b and opposing the second flange portion 80 of the flange 32b. As illustrated in FIG. 11, the offset portion 88 generally lies in the plane 86 of the first flange portion 80 and abuts the bridging portion 82, in one position, to inhibit swinging movement thereof in one direction. The flange portion 88 and flange portion 80 are pivotally connected for relative swinging movement via a pivot pin 90. The flange portions 80 and 88 and the pivot 90 cooperate to define a hinge which permits relative swinging movement of the flange members 60b relative to the flange members 32b. A planar door panel, generally designated 92, is mounted on the flange 60b with a bolt 40 and a bracket, generally designated B. Such a door panel 92 may be mounted on the front of the unit 10 illustrated in FIG. 1, by substituting two connectors 30b for the two forwardmost connectors 30 mounted on one of the sidewalls 12. It should be understood that the hinges 60b, 90 permits the door 92 to swing outwardly between an open position and a closed position in which the end face 24b of panel 22b lies in the plane 56b of the right angularly related adjacent panel and likewisely that the plane 58b of the outer face 22b of the adjacent panel lies outwardly of the end face 24b.

THE OPERATION

The various panels 12, 14, 16, and 18, may be cut to suitable size and a plurality of bores 42 and counterbores 44 provided therein at the manufacturing site. The various panels 12, 14, 16, and 18, the coupling members 30, 30a, and 30b, and the bolts 40, may be packaged at the manufacturing site for shipment in a compact package to the ultimate user. The purchaser can easily and quickly couple the panels together via the coupling members 30, 30a and 30b, in a variety of different combinations depending on his particular needs. The units thus assembled can be disassembled and reassembled in another furniture configuration to form seats, storage units, bed frames, etc. as illustrated in FIGS. 6–8. The purchaser may subsequently purchase additional modular units, or portions of modular units, to accommodate his subsequent needs. The apparatus, when assembled, provides a new and novel aesthetic item of furniture.

When assembled, a basic furniture unit will be provided as illustrated in FIG. 1. If desired, the rear wall panel 18 need not be installed, in which case the connectors 30a along the rearwardmost portion of sidewalls 12 would be replaced by connectors 30. On the other hand, the purchaser can order an additional panel 92 and install a door on the forward edge of one sidewall 12 via connectors 30b.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. An article of furniture which can be assembled and disassembled, comprising:
   a plurality of generally planar, angularly related panels, each having
   first and second generally parallel side faces; and
   a first plurality of bolt-receiving bores adjacent the edge portions of said panels extending from said first side face to said second side face;
   corner connector means which detachably couples said panels together in a predetermined angular relationship but with adjacent border edge portions of adjacent panels being in spaced-apart relation that provides gaps between adjacent edges of adjacent panels, each comprising:
   a plurality of individual bracket members independent of each other bracket member, each bracket member including angularly related integral flange members, each having an inner surface and an outer surface abutting one of said panel side faces;
   each of said flange members including an annular projection extending outwardly from said outer surface of said flange member and received by said bolt-receiving bores in said panels;
   each of said projections having an internally threaded bolt-receiving bore therethrough; and
   bolt means, received by said bolt-receiving bores in said panel and threadedly coupled to said bolt-receiving bores of said projections, which releasably clamps said flange members to said panels;
   the length of said bracket members in a direction parallel to the panel edge portion to which it is coupled, being substantially less than the length of the panel edge portion to which it is coupled whereby unobstructed openings are provided between the adjacent border edge portions of adjacent panels substantially the length of said edge portions.

2. An article of furniture including a plurality of generally planar, angularly related panels, each having generally parallel side faces and a plurality of bolt-receiving bores adjacent the edge portions of said panels, extending between said side faces;
   connector means which detachably couples a plurality of panels disposed in a predetermined angular relation but with adjacent border edge portions of adjacent panels in spaced-apart relation that provides gaps between adjacent edge portions of adjacent panels, comprising:
   a plurality of individual bracket members independent of the other bracket members, each bracket member including three angularly related, integral planar flange members disposed generally perpendicular to one another, each having inner and outer surfaces;
   each of said flange members including an annular projection extending outwardly from said outer surface for receipt in said bolt-receiving bores in said panels;
   said projections each including an annular sidewall provided with a bolt-receiving bore therethrough, having an axis inclined to plane of said respective flange member;
   said bracket members being spaced apart, and the length of each bracket member, in a direction parallel to the border edge portion to which it is to be mounted being substantially less than the length of said border edge portion, whereby said gap provides an unobstructed outwardly-opening open-ended opening along substantially the entire length of said border edge.

3. The coupling apparatus set forth in claim 1 wherein gusset means spans said angularly related flange members.

4. The coupling apparatus set forth in claim 1 wherein said flange members comprise three, generally planar, integral, flanges disposed at right angles relative to each other.

5. The coupling apparatus set forth in claim 1 wherein said projection means includes internal threads and said bolt means includes external threads threadedly receivable by said internal threads.

6. The coupling apparatus set forth in claim 1 including hinge means mounting one of said flange members for swinging movement on another of said flange members.

7. The coupling apparatus set forth in claim 6 wherein said hinge means comprises an offset portion on said one flange member extending generally parallel to a first flange portion of said another flange member, and means coupling said offset portion and said portion of said another flange member for swinging movement.

8. The coupling apparatus set forth in claim 7 wherein said another flange member includes a second generally planar flange portion, said first flange portion extending outwardly away from and generally parallel to said second planar portion, and a bridge portion bridging said first and second portions; said one flange member including an offset planar portion generally lying in the plane of said second planar portion in opposed relation with said first portions, said hinge means including means swingably connecting said first flange portion and said offset flange portion.

9. The article of furniture set forth in claim 2 wherein said coupling means includes hinge means mounting one of said flange members for swinging movement relative thereto.

10. The article of furniture set forth in claim 2 wherein said coupling means comprises a plurality of angularly related flange members abutting said inner faces of adjacent ones of said panels; and hinge means mounting one of said flange members for swinging movement on another of said flange members.

11. The article of furniture set forth in claim 10 wherein said hinge means comprises an offset flange portion on said one flange member extending in opposed relation to a portion of another flange member, and means coupling said offset flange portion to said portion of said another flange for swinging movement.

12. The article of furniture set forth in claim 11 wherein said another flange member includes a second generally planar flange portion, said first flange portion lying in a plane offset from the plane of said second flange extending outwardly away from said second flange portion and lying in a plane offset from the plane of said second flange portion and a bridge portion coupling said first and second flange portion; said one flange member including an offset flange portion generally lying in the plane of said second flange portion in opposed relation with said first flange portion; said hinge means including means swingably connecting said offset flange portion and said first flange portion.

13. The article of furniture set forth in claim 1, wherein said plurality of flange members comprise three, generally planar, integral flanges disposed at right angles relative to each other.

14. In a furniture component, a joint comprising:
first, second and third panels, each panel having a first side face, a second oppositely-disposed side face, and an aperture at a border edge portion of said panel extending from said first side face to said second side face;
first and second connectors that maintains side panels in a predetermined angular, but spaced-apart, relationship that provides outwardly opening openings between adjacent edges of adjacent panels substantially the length of said panel edge, each of said connectors comprising first and second angularly-related flange members, each of said flange members having an inner surface and an outer surface abutting one of said side faces;
each of said connectors including an annular projection extending outwardly from said outer surface of said flange member, each of said projections having an aperture and an internal thread located within said aperture;
said projection of said first flange member of said first connector seated in one end of said aperture of said first panel;
said projection of said first flange member of said second connector seated in the other end of said aperture of said first panel;
said projection of said second flange member of said first connector seated in said aperture of said second panel;
said projection of said second flange member of said second connector seated in said aperture of said third panel;
a first bolt securing said second panel to said first connector, said first bolt extending through said aperture in said second panel and threaded in said internal thread in said aperture of said projection of said second flange member of said first connector element;
a second bolt securing said third panel to said second connector, said second bolt extending through said aperture in said third panel and threaded in said internal thread in said aperture of said projection of said second flange member of said second connector; and,
a third bolt securing said first flange members of said first and second connectors to said first panel, said third bolt having a shaft with an unthreaded shaft portion extending through said aperture in said projection of said first flange member, first connector and a threaded portion received in threaded engagement in said internal thread of said projection of said first flange member of said second connector.

15. The joint set forth in claim 14, wherein the width of each bracket member is substantially less than the length of the edge of said panel to which it is mounted.

16. The joint set forth in claim 15, wherein said first and second connectors each include a third flange member generally perpendicular to said first and second flange members.

* * * * *